(12) United States Patent
Watanabe et al.

(10) Patent No.: US 8,512,078 B2
(45) Date of Patent: Aug. 20, 2013

(54) SOCKET FOR HOLDING ELECTRONIC DEVICE AND FLAME SENSOR

(75) Inventors: Takashi Watanabe, Tokyo (JP); Motonori Futamura, Tokyo (JP); Raita Mori, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 13/246,900

(22) Filed: Sep. 28, 2011

(65) Prior Publication Data

US 2012/0081847 A1    Apr. 5, 2012

(30) Foreign Application Priority Data

Sep. 30, 2010  (JP) .................................. 2010-221353

(51) Int. Cl.
*H01R 13/66* (2006.01)
(52) U.S. Cl.
USPC .................................................... 439/620.21
(58) Field of Classification Search
USPC ............... 439/620.01, 620.21, 271, 455, 913; 73/753, 756
See application file for complete search history.

(56) References Cited

U.S. PATENT DOCUMENTS

| | | | |
|---|---|---|---|
| 7,322,827 B2 * | 1/2008 | Frawley et al. | 439/31 |
| 7,686,651 B2 * | 3/2010 | Shinjo | 439/620.22 |
| 8,231,406 B2 * | 7/2012 | Burris et al. | 439/578 |
| 8,257,115 B2 * | 9/2012 | Herring | 439/620.21 |
| 2007/0111572 A1 * | 5/2007 | Frawley et al. | 439/165 |

FOREIGN PATENT DOCUMENTS

JP    2004-11895 A    1/2004

* cited by examiner

*Primary Examiner* — Khiem Nguyen
(74) *Attorney, Agent, or Firm* — Troutman Sanders LLP

(57) ABSTRACT

A case is provided for holding an ultraviolet detecting device in a state wherein an electrode-side terminal portion of the ultraviolet detecting device is inserted into one end portion. A conducting portion is provided connected on one end to an electrode terminal portion of the ultraviolet detecting device with the other end led out from the other end portion of the case. A sealing member is provided attached removably to the case. The sealing member seals airtight between the inside and the outside of the case in a state wherein a cable of the conducting portion passes therethrough.

5 Claims, 5 Drawing Sheets

SOCKET FOR HOLDING ELECTRONIC DEVICE AND FLAME SENSOR

CROSS REFERENCE TO RELATED APPLICATIONS

The present application claims priority under 35 U.S.C. §119 to Japanese Patent Application No. 2010-221353, filed Sep. 30, 2010, which is incorporated herein by reference.

FIELD OF TECHNOLOGY

The present invention relates to a socket for holding electronic device, and a flame sensor, provided with a packing as a seal material.

BACKGROUND OF THE INVENTION

Conventionally, when measuring, from the outside, something to be measured that is within a space wherein, for example, a toxic gas is produced, a through hole is provided, for the measurement, in a wall that surrounds the space, and an electronic device for measuring is attached in the through hole. In this case, the attaching part of the electronic device uses a sealing structure that cuts off between the space and the outside air. As a conventional sealing structure of this type there is, for example, that which is disclosed in Japanese Unexamined Patent Application Publication 2004-11895 ("JP '895").

The sealing structure disclosed in JP '895 seals between a cylindrical member that structures a portion of a through hole, and a flame sensor that is housed within the cylindrical member. The space between the cylindrical member and the main body of the sensor is sealed by a sealing material.

In this flame sensor, the use of a sealing structure at the electrode terminal side as well makes it possible to achieve a further improvement in the sealing performance. When sealing the electrode terminal side of the flame sensor, a liquid or gel potting agent or adhesive agent is often used to fill around the electrode terminals.

However, this seal performed by filling with a liquid or gel potting agent or adhesive agent has poor productivity, and bubbles may occur therein, reducing the airtightness, and thus there has been the danger that the desired sealing performance may not be produced. The reason why productivity has been poor is that the potting agent or adhesive agent requires some time to harden, and thus it has been necessary to wait, after filling, before transferring to the next step.

The reason why bubbles have been produced is that sometimes the filling is performed while incorporating the surrounding air into the filling agents. In order to prevent this, it is necessary to perform degassing by applying a vacuum, increasing the manufacturing cost.

The reason why the airtightness is low is that, after filling, the adhesive part of the filling agent peels off, due to fluctuations in temperature.

The present invention is to solve problems such as set forth above, and the object thereof is to provide an electronic device holding socket that can seal, with higher productivity and reliability, the electrode side of an electronic device, and to provide a flame sensor with improved productivity and sealing performance.

SUMMARY OF THE INVENTION

In order to achieve such an object, the electronic device holding socket according to the present example includes a case for holding an electronic device in a state wherein an electrode-side terminal portion of the electronic device is inserted into one end portion; a conducting portion that is connected on one end to the electrode portion of the electronic device and wherein the other end is led out from the other end portion of the case; a sealing member for sealing airtightly between an inside and an outside of the case in a state wherein the conducting portion passes therethrough, provided attached removably to the case.

The present example can have the case formed in the shape of a cylinder, having an opening portion into which the electronic device is inserted, and a dividing wall through which the conducting portion passes; the dividing wall is formed so as to divide the case into an inside and an outside; a retaining member is provided connected to the dividing wall on the inside of the case; the sealing member forms, from an elastic member that is monolithic, a seal portion between the dividing wall and the conducting portion, and a bearing portion that extends from the seal portion between the dividing wall and the retaining member; and the bearing portion is pressed by the retaining member to press against the dividing wall.

In a further example, a part of the dividing wall through which the conducting portion passes is formed by a through hole; a part of the conducting portion which passes through the through hole is formed by a cable; and an opening edge portion of the through hole of the dividing wall, on the inside of the case, is formed into a tapered surface wherein the opening dimension gradually gets smaller towards the dividing wall. Furthermore, the retaining member is connected to the dividing wall by a bolt that passes through the dividing wall and the sealing member.

An additional example is when the retaining member is provided with a stopper that extends towards the dividing wall. A flame sensor according to the present invention is structured so as to hold an ultraviolet detecting device as an electronic device in an electronic device holding socket according to an aforementioned invention.

The present invention enables an improvement in productivity because there is no need for waiting time for hardening, when compared to the case wherein a filling agent is used, because a sealing material that can adhere to the case is used as the sealing material. Moreover, this sealing material does not produce an air layer in the sealing portion, and does not peel away with fluctuations in temperature, when compared to the filling agent, thus enabling the sealing performance to be maintained over an extended period of time.

Furthermore, the present invention makes it possible to provide a socket for holding an electronic device, which, along with increasing productivity, makes it possible to seal the electrode side of the electronic device reliably.

DETAILED DESCRIPTION OF THE INVENTION

An example of the socket for the an electronic device and the flame sensor is explained in detail using FIG. 1 through FIG. 6.

Figure 1:
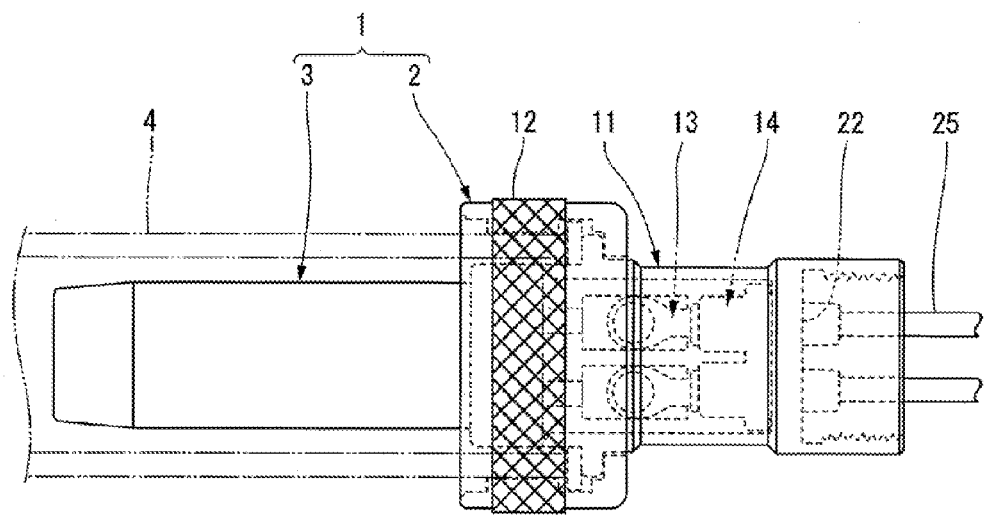
FIG. 1 is a plan view of a flame sensor provided with a socket for holding an electronic device.

The flame sensor illustrated in FIG. 1 is for detecting whether or not there is a flame in a burner in a heating furnace (not shown), where the electronic device holding socket 2 according to the example is structured from an ultraviolet detecting device 3 that is mounted in a socket 2. In the present example, the "electronic device" is structured from this ultraviolet detecting device 3. This flame sensor 1 is used in a state wherein it is attached at one end portion of a cylinder 4 that is provided in the heating furnace. When attaching the flame sensor 1 to the cylinder 4, the ultraviolet detecting device 3 is inserted into the cylinder 4.

This cylinder 4 is provided in the wall of the heating furnace so as to face the burner. That is, the flame sensor 1 detects the flame of the burner through the cylinder 4.

Figure 2:
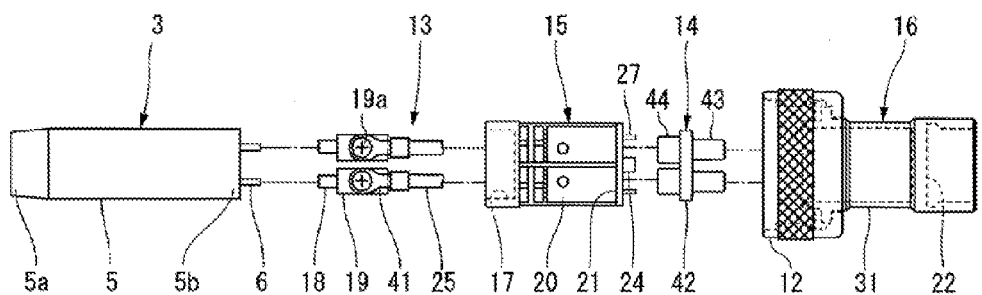
FIG. 2 is a plan view illustrating the disassembled state of the flame sensor.

The ultraviolet detecting device 3, as illustrated in FIG. 2, is formed so that one end portion 5a of a cylindrical rod-shaped main unit 5 is a photosensitive portion. A plurality of pin-shaped electrode terminals 6 protrude at the other end portion 5b of the main unit 5.

The electronic device holding socket 2, as illustrated in FIG. 1, includes a case 11 for holding the ultraviolet detecting device 3; a nut member 10 for securing the case 11 to the cylinder 4; conducting portions 13 for connecting an electrode terminal 6 of the ultraviolet detecting device 3; and a packing 14, which functions as sealing material for sealing airtightly, by blocking airflow from the inside to the outside of the case 11, that is, from the left end to the right end in the figure.

Figure 6:
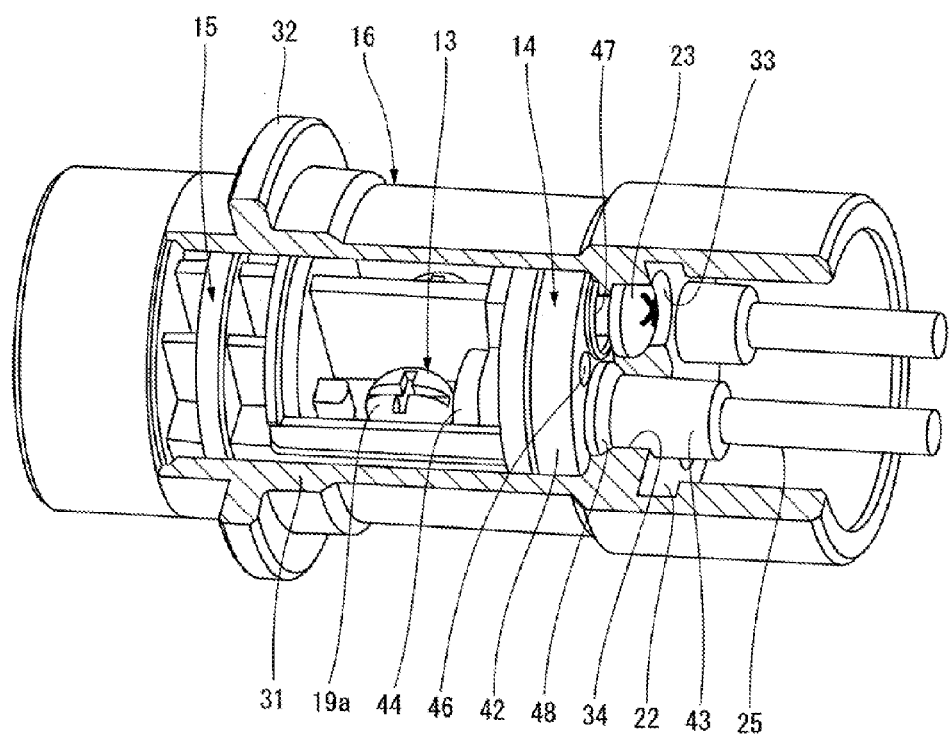
FIG. 6 is a perspective diagram, which is a drawing of the state wherein a portion of the cylindrical member has been cut away.

As illustrated in FIG. 2 and FIG. 6, the case 11 is structured through a combination of a plurality of members. The case #11 in the present example is structured from a holding member 15 to which the ultraviolet detecting device 3 is connected, and a cylindrical member 16 that covers the holding member 15.

The holding member 15 is formed in a specific shape from plastic that has thermal durability and insulating properties. A recessed portion 17 into which the ultraviolet detecting device 3 fits is formed at one end portion of the holding member 15. In the present example, the "opening portion into which the electronic device is inserted" is structured from the opening portion in this recessed portion 17.

Although not shown in the diagram, the bottom of the recessed portion 17 is provided with holes into which the plurality of electrode terminals 6 of the ultraviolet detecting device 3 is inserted. Contact-type connectors 18 for the conducting portions 13, described below, are provided within the holes. That is, the ultraviolet detecting device 3 is fitted into the recessed portion 17 of the holding member 15 to not only be supported on the holding member 15, but to also be electrically connected to the conducting portions 13.

A terminal block 20 for supporting a fastening plate 19, described below, for the conducting portions 13 is provided in the center portion, in the lengthwise direction (the left/right direction in FIG. 2) of the holding member 15. An attaching seat 21, for attaching the holding member 15 to the cylindrical member 16, described below, is formed integrally with the other end portion of the holding member 15. In the present example, the "retaining member" is structured from this attaching seat 21.

Figure 3:
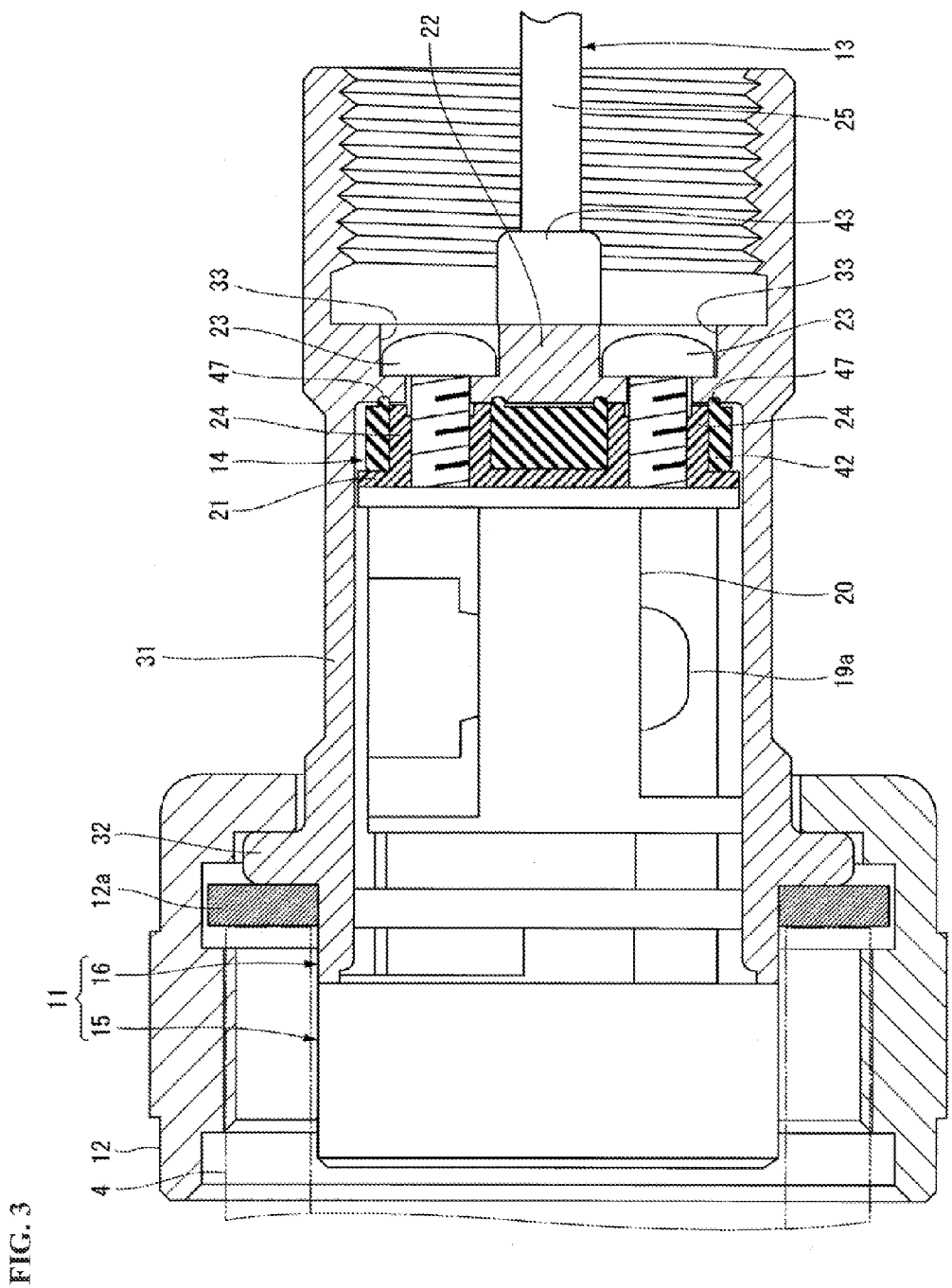
FIG. 3 is a cross-sectional diagram of the case and the nut member.

The attaching seat 21, as illustrated in FIG. 3, is secured to a dividing wall 22 within the cylindrical member 16, described below, by two fastening bolts 23, in a state wherein the packing 14 is held between the dividing wall 22 and the attaching seat 21.

The end face that faces the dividing wall 22 in the attaching seat 21 is formed so as to be circular. Two bosses 24 protrude on this end face. Female threads (not shown) into which are screwed fastening bolts 23 are formed in the inner portions of these bosses 24. Moreover, these bosses 24 are formed in positions that are spaced on one side and the other side of a radial direction of the circular end face. The fastening bolts 23 are screwed into the bosses 24 through the dividing wall 22 and the packing 14.

Figure 4:
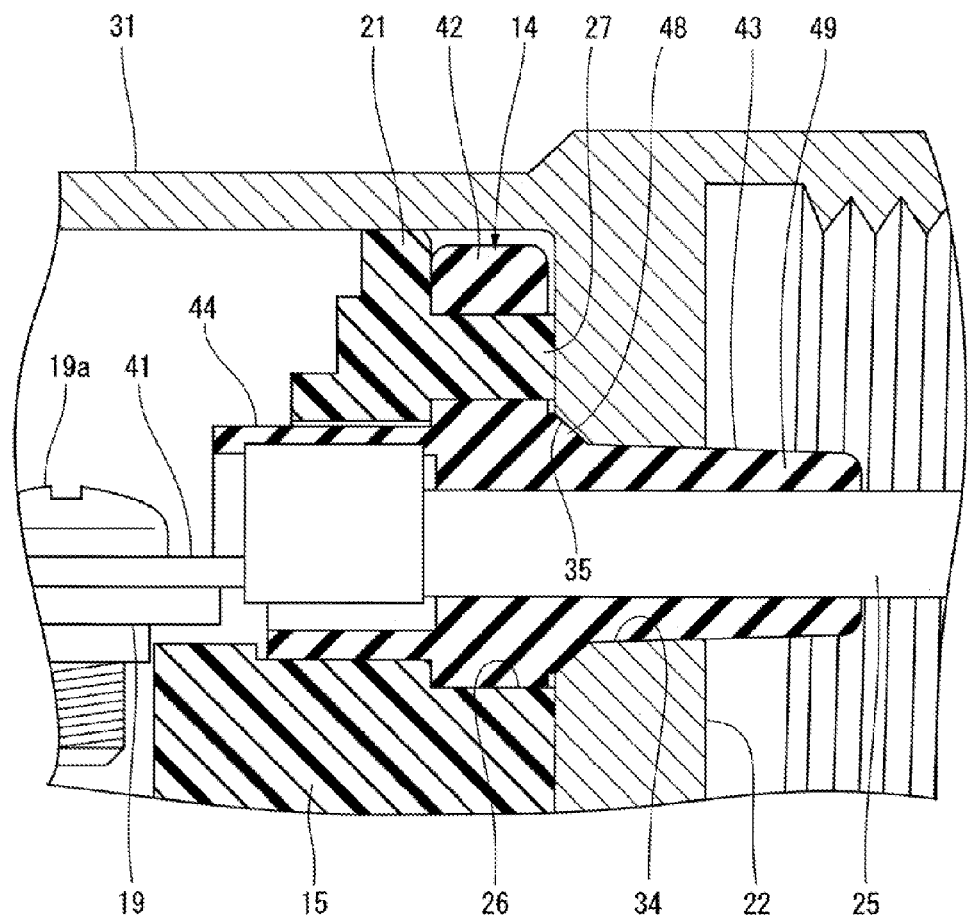
FIG. 4 is a cross-sectional diagram illustrating portions in enlargement.

As illustrated in FIG. 4, through holes 26, through which cables 25 of the conducting portions 13, described below, pass are provided at positions near to the pair of bosses 24 in the attaching seat 21. Moreover, these through holes 26 are each formed in positions that are spaced on one side and the other side of a radial direction of the end face.

Moreover, a plurality of pins 27 (shown in FIG. 4) protrudes extending towards the dividing wall 22 at the outer peripheral part of the attaching seat 21. In the present example, the "stopper" is structured from these pins 27 and the bosses 24.

The cylindrical member 16 of the case 11 is formed from metal, and, as illustrated in FIG. 3 and FIG. 6, is structured from a cylinder 31 and a dividing wall that divides the cylinder 31 into an inside and an outside. A flange 32 can be formed monolithically on the outer peripheral part of one end portion of the cylinder 31. The flange 32, as illustrated in FIG. 3, faces the tip end face of the cylinder 4 across a nut packing 12a that is held in a nut member 12, and is pushed towards the cylinder 4 by the outer peripheral portion of the nut member 12. The nut member 12 comprises a so-called "union nut," and fits rotatably on an outer peripheral portion of the cylinder 31, and is formed so as to screw onto the tip end portion of the cylinder 4. The nut member 12 is screwed onto the cylinder 4 to push the flange 32 towards the cylinder 4 side, to cause the nut packing 12a to be pressed between the cylinder 4 and the flange 32, to seal the connecting portion between the nut 4 and the case 11.

Bolt through holes 33 are provided in the dividing wall 22, as illustrated in FIG. 3, at positions facing the bosses 24 of the attaching seat 21. Moreover, a cable through hole 34 is provided in the dividing wall 22, as illustrated in FIG. 4, in a part facing a through hole 26 of the attaching seat 21.

A tapered surface 35, wherein the opening dimension gradually becomes smaller towards the dividing wall 22 is provided at an opening edge part of the cable through hole 34 that is on the inside case side of the dividing wall 22, as illustrated in FIG. 4.

The conducting portions 13, as illustrated in FIG. 2, are structured from contact-type connectors 18 that connect to the electrode terminals 6 of the ultraviolet detecting device 3, fastening plates 19 that are connected to the contact-type connectors 18, press-fit terminals 41 that are connected by the fastening bolts 19a to the fastening plates 19, and cables 25 that are connected to the press-fit terminals 41.

These contact-type connectors 18, fastening plates 19, press-fit terminals 41, and cables 25 are provided in two assemblies, corresponding to the plurality of terminal electrodes 6 of the ultraviolet detecting device 3.

The cables 25, as illustrated in FIG. 4, lead out to the case 11 through the through holes 26 of the attaching seat 21 and the cable through hole 34 of the dividing wall 22.

The packing 14 is formed in a specific shape from an elastic member having thermal durability. The packing 14 in the present example, as illustrated in FIG. 5 and FIG. 6, is structured from a disk portion 42, first cylindrical portions 43 and 43, provided for each cable 25 and formed integrally with the disk portion 42, and second cylindrical portions 44 and 44.

The disk portion 42, as illustrated in FIG. 3, is held between the attaching seat 21 and the dividing wall 22. The thickness of the disk portion 42 is equal to the length of the boss 24 and the pin 27, or is formed so as to be slightly shorter (thinner) than these members. The outer diameter of this disk portion 42 is formed so as to have a size that is equal to the outer diameter of the end face of the attaching seat 21.

Figure 5:
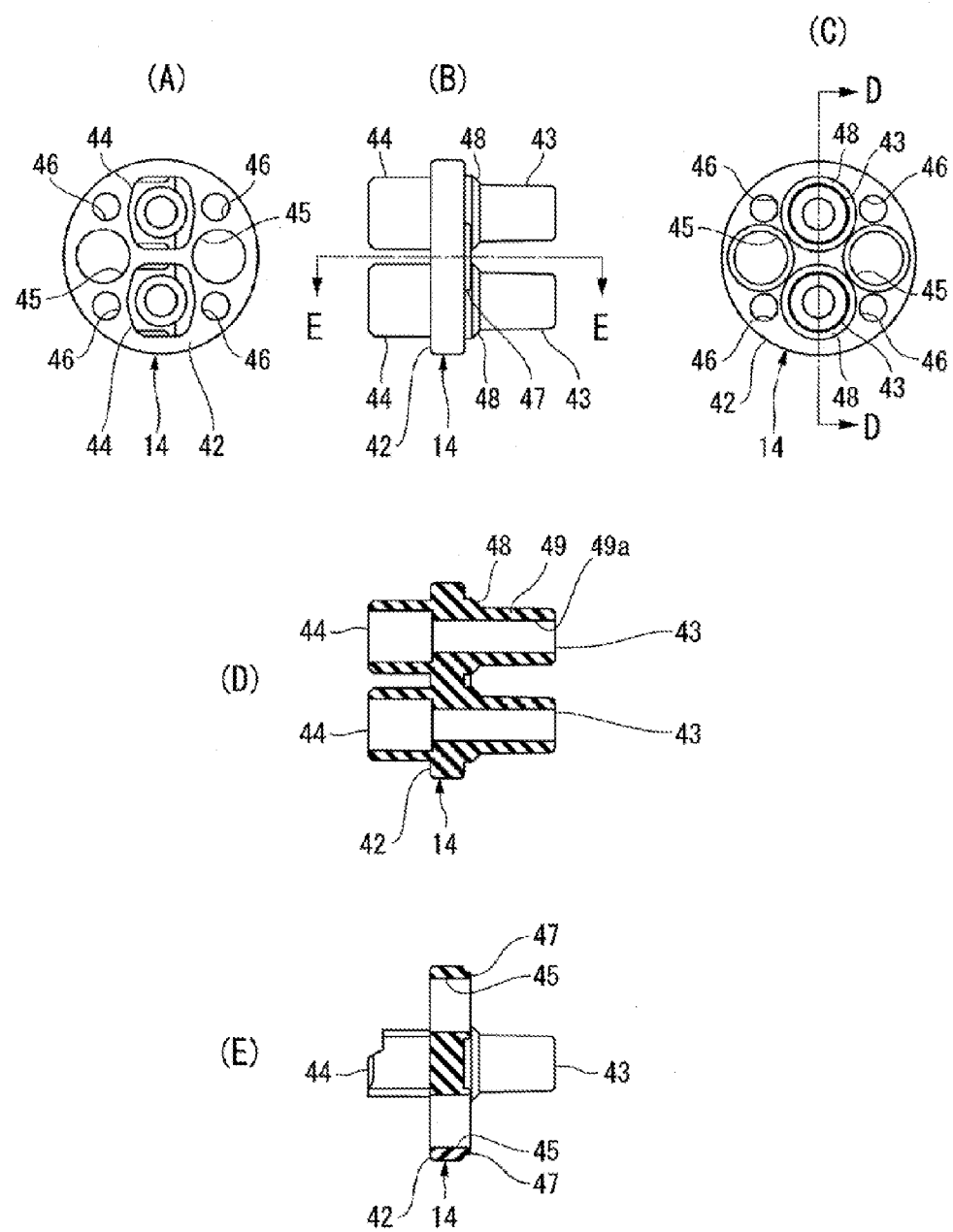
FIG. 5 is a diagram illustrating the packing, wherein (A) is a front view, viewed from the electronic device side, (B) is a side view, (C) is a back view, (D) is a cross-sectional diagram along the section D-D in (C), and (F) is a cross-sectional diagram along the section E-E in (B).

As illustrated in FIG. 5 (A) and (C), first through holes 45, through which the bosses 24 pass, and second through holes 26, through which the pins 27 pass, are formed in the disk portion 42. As illustrated in FIG. 5 (B) and (E), an annular protrusion 47 is formed so as to encompass the first through holes 45 on the opening edge portions of the first through holes 45, which are the end face of the disk portion 42 that faces the dividing wall 22. This protrusion 47, as illustrated in FIG. 3, is formed so as to protrude towards the dividing wall 22 side beyond the boss 24 in a form wherein the packing 14 is installed on the attaching seat 21. That is, the disk portion 42 of the packing 14 is pressed by the attaching seat 21 towards the dividing wall 22 side, so that the protrusion 47 is pressed tightly against the opening portion of the bolt through holes 33 of the dividing wall 22, to seal the opening portions thereby.

The first cylindrical portions 43 are for filling and sealing between the dividing wall 22 and the cables 25, and thus are structured from a conical portion 48 (shown in FIG. 5 (B) and (D)), that is provided on the end face of the disk portion 42 that faces the dividing wall 22, and a cylinder portion 49 that protrudes from the conical portion 48 to the side opposite of the disk portion 42. The conical portion 48, as illustrated in FIG. 4, is formed so as to fit onto the tapered surface 35 of the dividing wall 22. That is, the conical portion 48 is formed so that the outer diameter thereof gradually becomes smaller the further from the disk portion 42. The angle of the outer peripheral face of the conical portion 48 relative to the axis of the conical portion 48 (the angle of inclination of the tapered surface 35) is formed to be 45°.

The cylinder portions 49 are formed so as to protrude to the opposite side through the cable through holes 34 of the dividing wall 22. Circular holes 49a formed in hollow portions of the cylinder portions 49 are formed so as to connect to the second cylindrical portions 44, described below, through the disk portion 42, as illustrated in FIG. 5 (D). The inner diameters of the circular holes 49a are formed to a size that fit the cables 25.

The second cylindrical portions 44, as illustrated in FIG. 4, protrude from the disk portion 42 to the side opposite from the first cylindrical portions 43, and are formed so as to cover the connecting parts between the cables 25 and the press-fit terminals 41. That is, the packing 14 and has, along with the sealing function, a function for insulating between the cables 25 and the case 11. In the present example, the "seal portion" is structured from the first cylindrical portion 43, and the "pressure bearing portion that extends from the seal portion between the dividing wall and the retaining member" is structured from the disk portion 42.

In order to assemble the socket 2 of the flame sensor 1, structured as described above, first the conducting portions 13 and the packing 14 are assembled together with the holding member 15, and then this assembly is inserted into the interior of the cylindrical member 16 from one end portion. At this time, the cable 25 and the first cylindrical portion 43 of the packing 14 are inserted into the cable through hole 34 of the dividing wall 22. Thereafter, the fastening bolts 23 are inserted into the bolt through holes 33 of the dividing wall 22 from the outside of the cylindrical member 16, and screwed into the bosses 24. The fastening bolts 23 being screwed into the bosses 24 in this way causes the disk portion 42 of the packing 14 to be held between the attaching seat 21 of the holding member 15 and the dividing wall 22, so that the packing 14 seals between the inside and the outside of the case 11 airtightly.

Consequently, the electronic device holding socket 2 according the present example enables an improvement in productivity because there is no need for waiting time for hardening, when compared to the case wherein a filling agent is used, because the packing 14 is used as the sealing material. Moreover, the packing 14 does not produce an air layer in the sealing portion, and does not peel away with fluctuations in temperature, when compared to the filling agent, thus enabling the sealing performance to be maintained over an extended period of time.

Consequently, the present example makes it possible to provide a socket 2 for holding an electronic device, which, along with increasing productivity, makes it possible to seal the electrode side of the electronic device (the ultraviolet detecting device 3) reliably.

The case 11 according to the present example is formed in a cylindrical shape having an opening portion (a recessed portion 7) into which the electronic device (the ultraviolet detecting device 3) is inserted, and a dividing wall 22 through which the cables 25 of the conducting portions 13 pass. The dividing wall 22 is formed so as to divide the case 11 into an inside and an outside. On the inside portion of the case 11, an attaching seat 21 is provided secured to the dividing wall 22, and the packing 14 is structured from the first cylindrical portions 43, which fill the spaces between the dividing wall 22 and the cables 25, and the disk portion 42, which extends from the first cylindrical portions 43 between the dividing wall 22 and the attaching seat 21, and is formed from an elastic member that is monolithic. The disk portion 42 is pressed by the attaching seat 21 to press against the dividing wall 22.

Because of this, the parts wherein the cables 25 of the conducting portions 13 pass through the dividing wall 22 can be sealed reliably by the packing 14, making it possible to provide an electronic device holding socket 2 with substantially improved sealing performance.

The first cylindrical portion 43 in the present example is structured so as to have length that protrudes from the dividing wall 22. Because of this, the first cylindrical portions 43 guide the cables 25 near the outside of the dividing wall 22, thus making it possible to prevent changes in the orientations of the cables 25 that might interfere with the sealing performance.

In the present example, the parts through which the conducting portions 13 pass in the dividing wall 22 are formed by cable through holes 34, and the parts of the conducting portions 13 that pass through the through holes 34 are formed by the cables 25. Additionally, a tapered surface 35, wherein the opening dimension gradually becomes smaller towards the dividing wall 22 is provided at an opening edge part of the cable through hole 34 that is on the inside case side of the dividing wall 22.

Because of this, the packing 14 in the present example deforms in accordance with the tapered surface 35, through being pressed by the attaching seat 21, to press against the cables 25. Consequently, the spaces between the packing 14 and the cables 25 can be sealed reliably, making it possible to provide an electronic device holding socket 2 wherein the sealing performance is improved even further.

The attaching seat 21 in the present example is secured to the dividing wall 22 by the fastening bolts 23 that pass through the dividing wall 22 and the packing 14.

Because of this, the bolt through holes through which the bolts 23 that secure the attaching seat 21 to the dividing wall 22 pass can be sealed by the packing 14. In particular, in the present example, the protrusions 47 of the packing 14 tightly seal the opening parts of the bolt through holes 33 of the dividing wall 22, to improve substantially the sealing performance. Consequently, the present example makes it possible to assemble the electronic device holding socket 2 easily, because there are fewer components than when compared to the case wherein a specialized sealing material is used for sealing the bolt through holes.

The attaching seat 21 according to the present example is provided with stoppers (bosses 24 and pins 27) that extend towards the dividing wall 22. Because of this, it is possible to constrain the amount of compression of the packing 14, because the movement of the attaching seat 21 towards the dividing wall 22 is constrained by the stopper contacting the dividing wall 22. Consequently, the present example makes it possible to provide a socket 2 for holding an electronic device, wherein the packing 14 is compressed appropriately, thus making it possible to maintain the sealing performance in an excellent state over an extended period of time.

The flame sensor according to the present example is structured holding an ultraviolet detecting device 3 in a socket wherein the packing 14 is the seal material. Because of this, the present example makes it possible to provide a flame sensor 1 with higher productivity and sealing performance.

Note that the packing 14 illustrated in the examples set forth above is formed through an elastic resin that is able to withstand heat. This is because the present example relates to a flame sensor 1, where the flame sensor 1, and, by extension, the packing 14, is exposed to a high-heat environment, so the ability to withstand heat is required in the packing 14.

When the present invention is applied to other electronic devices aside from flame sensors, such as, for example, sensor devices that measure temperature, pressure, illumination levels, and the like, that are disposed in spaces wherein, for example, toxic gases are produced, there may not necessarily be the need for such thermal durability, but rather, in the examples described above, all that is necessary is to have the ability to adequately seal in order to block the toxic gases. That is, the physical properties of the packing 14 may be selected as appropriate for the intended application of the device.

The invention claimed is:

1. An electronic device holding socket, comprising:
a case holding an electronic device in a state wherein an electrode-side terminal portion of the electronic device is inserted into one end portion;
a conducting portion connected on one end to an electrode portion of the electronic device and wherein the other end is led out from the other end portion of the case; and
a sealing member sealing airtightly between an inside and an outside of the case in a state wherein the conducting portion passes therethrough, provided attached removably to the case, wherein
the case is formed in a shape of a cylinder, having an opening portion into which the electronic device is inserted, and a dividing wall through which the conducting portion passes,
the dividing wall is formed so as to divide the case into the inside and the outside,
a retaining member is provided connected to the dividing wall on the inside of the case,
the sealing member forms, from an elastic member that is monolithic, a seal portion between the dividing wall and the conducting portion, and a bearing portion that extends from the seal portion between the dividing wall and the retaining member, and
the bearing portion is pressed by the retaining member to press against the dividing wall.

2. The electronic device holding socket as set forth in claim 1, further comprising:
a part of the dividing wall, through which the conducting portion passes, being formed by a through hole;
a part of the conducting portion, which passes through the through hole, being formed by a cable; and
an opening edge portion of the through hole of the dividing wall, on the inside of the case, being formed into a tapered surface wherein an opening dimension gradually gets smaller towards the dividing wall.

3. The electronic device holding socket as set forth in claim 1, wherein
the retaining member is connected to the dividing wall by a bolt that passes through the dividing wall and the sealing member.

4. The electronic device holding socket as set forth in claim 1, wherein
the retaining member is provided with a stopper that extends towards the dividing wall.

5. A flame sensor comprising:
an ultraviolet detecting device as an electronic device; and
an electronic device holding socket, the ultraviolet detecting device being held in the electronic device holding socket, the electronic device holding socket having:
a case holding an electronic device in a state wherein an electrode-side terminal portion of the electronic device is inserted into one end portion;
a conducting portion connected on one end to an electrode portion of the electronic device and wherein the other end is led out from the other end portion of the case; and
a sealing member sealing airtightly between an inside and an outside of the case in a state wherein the conducting portion passes therethrough, provided attached removably to the case, wherein
the case is formed in a shape of a cylinder, having an opening portion into which the electronic device is inserted, and a dividing wall through which the conducting portion passes,
the dividing wall is formed so as to divide the case into the inside and the outside,
a retaining member is provided connected to the dividing wall on the inside of the case,
the sealing member forms, from an elastic member that is monolithic, a seal portion between the dividing wall and the conducting portion, and a bearing portion that extends from the seal portion between the dividing wall and the retaining member, and
the bearing portion is pressed by the retaining member to press against the dividing wall.

* * * * *